United States Patent
McMahon et al.

(10) Patent No.: US 9,810,085 B2
(45) Date of Patent: Nov. 7, 2017

(54) FLAP SEAL FOR GAS TURBINE ENGINE MOVABLE NOZZLE FLAP

(75) Inventors: Shawn M. McMahon, Pittsfield, MA (US); Kirk A. Shute, New Britain, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 543 days.

(21) Appl. No.: 13/214,425

(22) Filed: Aug. 22, 2011

(65) Prior Publication Data
US 2013/0048749 A1 Feb. 28, 2013

(51) Int. Cl.
| | |
|---|---|
| F02K 1/00 | (2006.01) |
| F01B 25/02 | (2006.01) |
| F04D 29/44 | (2006.01) |
| F01D 11/00 | (2006.01) |
| F01D 25/30 | (2006.01) |
| F02K 1/12 | (2006.01) |
| F02K 1/80 | (2006.01) |

(52) U.S. Cl.
CPC ............ *F01D 11/005* (2013.01); *F01D 25/30* (2013.01); *F02K 1/12* (2013.01); *F02K 1/805* (2013.01); *F05D 2240/55* (2013.01)

(58) Field of Classification Search
CPC .......... F01D 11/005; F01D 25/30; F02K 1/12; F05D 2240/55
USPC ................. 60/771, 770; 239/265.11, 263.37, 239/265.43; 415/160, 230; 277/553, 277/644, 637, 630; 220/319, 320, 323, 220/326, 324; 265/127.3, 265.35, 265.37
See application file for complete search history.

(56) References Cited

U.S. PATENT DOCUMENTS

| | | | | |
|---|---|---|---|---|
| 3,386,658 A | * | 6/1968 | Mehr | .................... F02K 1/1269 |
| | | | | 239/127.3 |
| 3,599,875 A | * | 8/1971 | Wynosky | .................. F02K 1/36 |
| | | | | 239/265.37 |
| 3,814,325 A | * | 6/1974 | McCardle, Jr. | ........ F02K 1/1261 |
| | | | | 239/265.39 |
| 3,868,815 A | * | 3/1975 | Stahlecker | ........................ 57/88 |
| 3,892,358 A | | 7/1975 | Gissien | |
| 4,575,006 A | | 3/1986 | Madden | |
| 4,575,099 A | | 3/1986 | Nash | |
| 4,892,254 A | | 1/1990 | Schneider et al. | |
| 5,101,624 A | * | 4/1992 | Nash et al. | ..................... 60/266 |
| 5,143,292 A | | 9/1992 | Corsmeier et al. | |

(Continued)

OTHER PUBLICATIONS

Extended European Search Report for European Application No. 12180917.2 dated Aug. 1, 2016.

*Primary Examiner* — Mark Laurenzi
*Assistant Examiner* — Deming Wan
(74) *Attorney, Agent, or Firm* — Carlson, Gaskey & Olds, P.C.

(57) ABSTRACT

A gas turbine engine nozzle includes a flap movable relative to a structure. A seal assembly is supported by one of the structure and the flap and includes a seal hinged about an axis. The seal has a sealing profile engaging a seal land of the other of the structure and the flap. A biasing member is configured to urge the hinged seal toward the seal land. A method of sealing a nozzle flap includes supporting a seal relative to a structure along an axis. The seal is urged toward a nozzle flap. The seal rotates about the axis to maintain engagement between the seal and the nozzle flap in response to the urging step.

12 Claims, 7 Drawing Sheets

(56) References Cited

U.S. PATENT DOCUMENTS

| | | | |
|---|---|---|---|
| 5,201,800 A * | 4/1993 | Wolf | F02K 1/1223 239/265.19 |
| 5,215,256 A | 6/1993 | Barcza | |
| 5,485,959 A * | 1/1996 | Wood | F02K 1/002 239/265.19 |
| 5,622,473 A * | 4/1997 | Payling | 415/160 |
| 5,794,851 A | 8/1998 | Barcza | |
| 6,205,772 B1 * | 3/2001 | Perrier et al. | 60/770 |
| 7,624,567 B2 | 12/2009 | Peters | |

* cited by examiner

FLAP SEAL FOR GAS TURBINE ENGINE MOVABLE NOZZLE FLAP

BACKGROUND

This disclosure relates to a gas turbine engine nozzle. In particular, the disclosure relates to a flap seal for a movable nozzle flap.

Typically, a turbojet engine utilizes a nozzle with movable flaps after its augmenter section. Seals are arranged within the nozzle to seal the flaps relative to adjacent support structure throughout the flap's range of motion.

A unitary metallic member having a V-shaped cross-section is used for one type of conventional seal. The rigid seal provides a pair of legs converging to an apex. The first leg is supported by a structure, and the second leg seals against the flap. The legs form a cavity. Pressure within the cavity of the flap seal urges the second leg into engagement with the structure and flap. The flexible legs of the seal also accommodate assembly tolerances within the nozzle.

SUMMARY

A gas turbine engine nozzle includes a flap movable relative to a structure. A seal assembly is supported by one of the structures and the flap and includes a seal hinged about an axis. The seal has a sealing profile engaging a seal land of the other structure and the flap. A biasing member is configured to urge the hinged seal toward the seal land. In this manner, the sealing function and assembly tolerance function of the seal assembly are decoupled from one another.

A method of sealing a nozzle flap includes supporting a seal relative to a structure along an axis. The seal is urged toward a nozzle flap. The seal rotates about the axis to maintain engagement between the seal and the nozzle flap in response to the urging step.

BRIEF DESCRIPTION OF THE DRAWINGS

The disclosure can be further understood by reference to the following detailed description when considered in connection with the accompanying drawings wherein.

DETAILED DESCRIPTION

Figure 1:
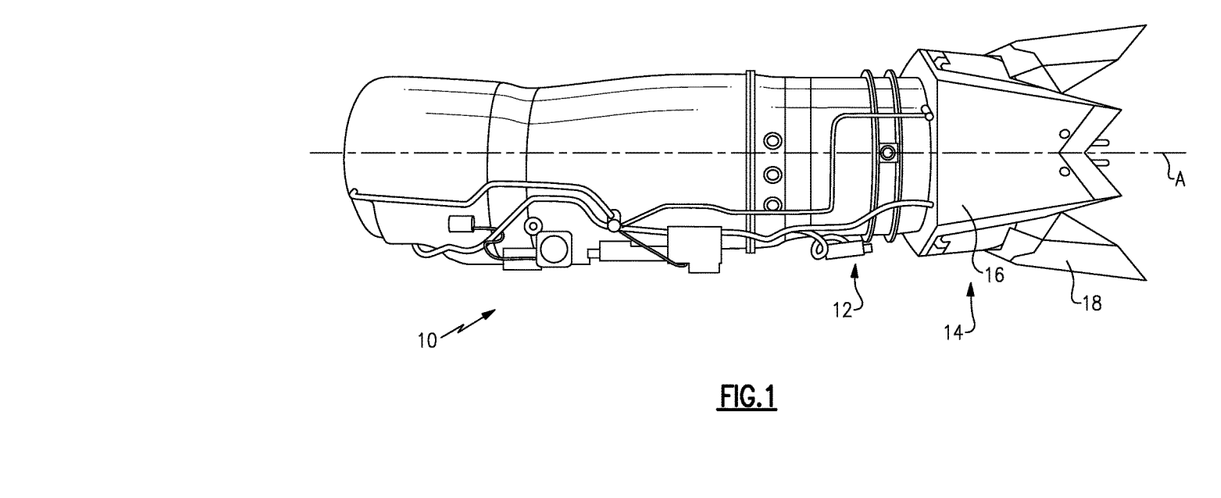
FIG. 1 is a schematic view of an example turbojet engine having a nozzle with movable flaps.

A gas turbine engine 10, such as a turbojet with an augmenter section 12, is illustrated in FIG. 1. A nozzle 14 is arranged at an exit of the augmenter 12. The nozzle 14 includes a structure 16 supporting movable flaps 18. The movable flaps 18 open and close between multiple positions about a longitudinal axis A to change the nozzle's exit area during operation of the turbojet engine.

Figure 2:
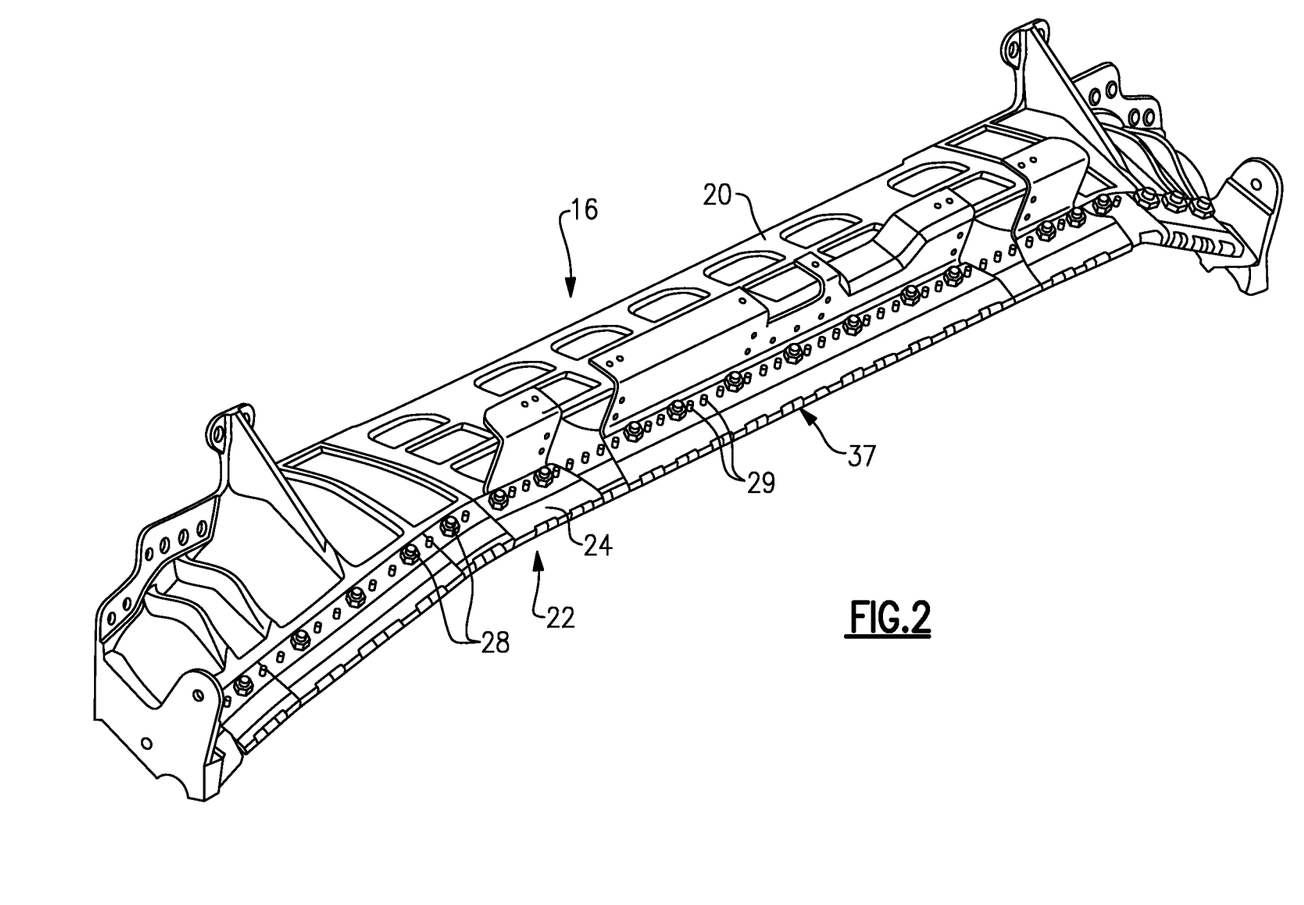
FIG. 2 is a perspective view of a structure configured to support a movable flap.
Figure 3:
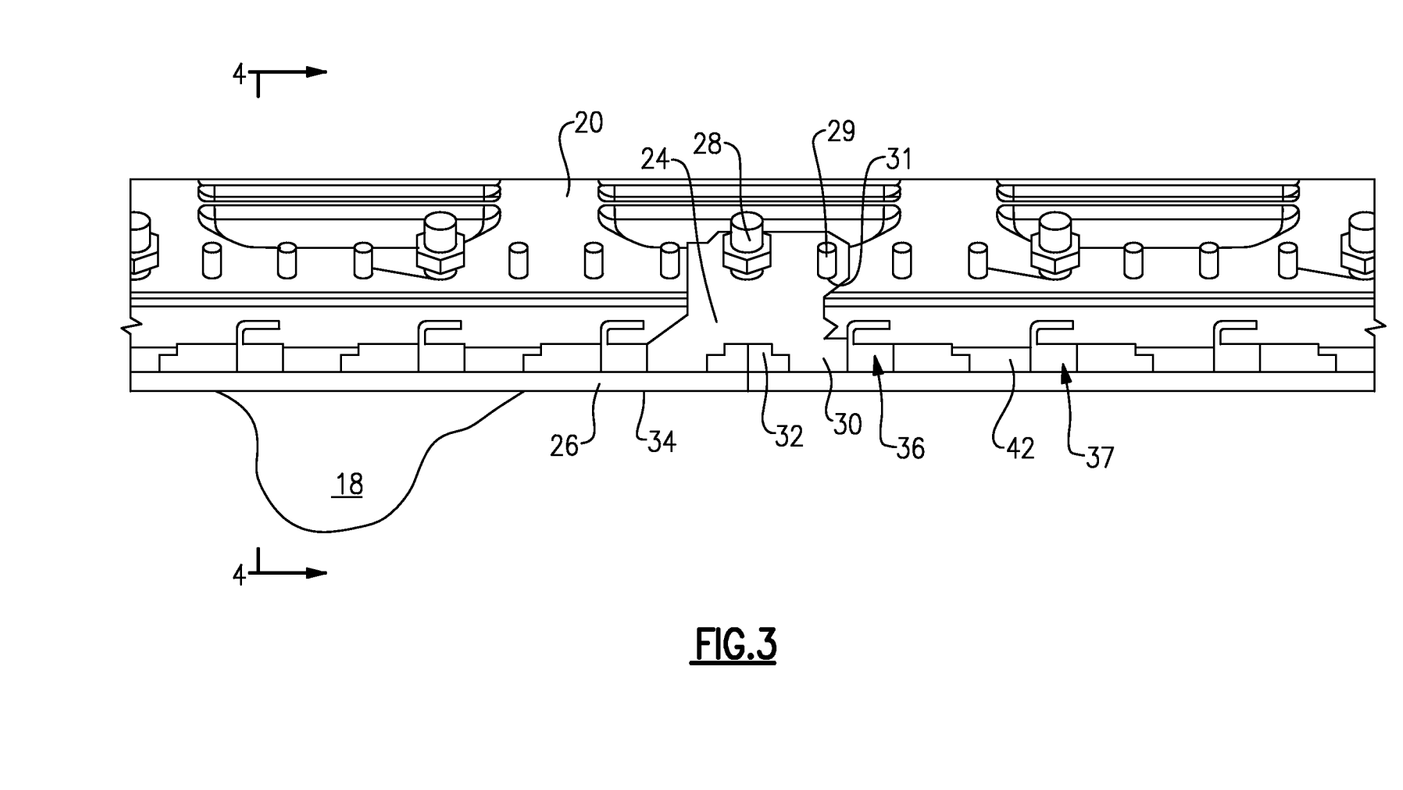
FIG. 3 is a rear view of the structure shown in FIG. 2 illustrating a seal assembly.

Referring to FIGS. 2 and 3, the structure 16 includes a hood 20 that is static or fixed. The hood 20 supports a seal assembly 22 constructed of multiple lateral segments. The seal assembly 22 includes a seal holder 24, secured to the hood 20 by fastening elements 28, 29, and a seal 26. The multiple components of the seal assembly 22 greatly reduce stress on seal 26, which is permitted to pivot relatively freely relative to the hood 20. In the example, the fastening elements 28, 29, correspond to bolts and rivets respectively. The rivets 29 extend through corresponding holes 31 in the structure 16.

Figure 4:
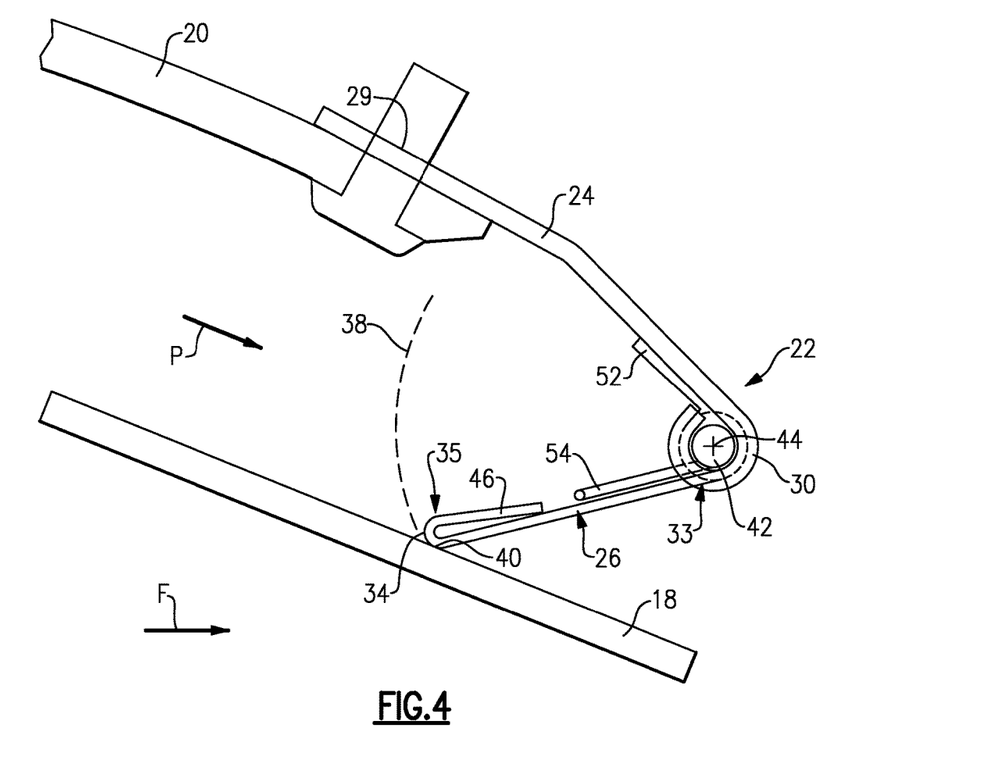
FIG. 4 is a cross-sectional view of the structure taken along line 4-4 in FIG. 3.

The seal holder 24 provides a first hinge portion 30, and the seal 26 includes a second hinge portion 32 that is pivotally supported by the seal holder 24. Only a small portion of the first hinge portion 30 is shown in FIG. 3 for clarity. The first and second hinge portions 30, 32 are arranged laterally adjacent to one another. As shown in FIG. 3, a gap 37 is provided between the first and second hinge portions 30, 32. A biasing member 36 is provided between the first and second hinge portions 30, 32 in the gap 37. Referring to FIG. 4, a pin 42 secures the first and second hinge portions 30, 32 to one another and provides an axis 44 about which the seal 26 pivots in an arc 38.

Figure 5:
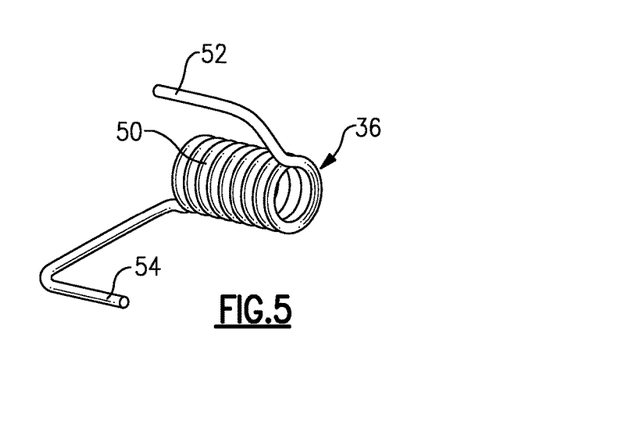
FIG. 5 is a perspective view of one example biasing member.

The seal 26 includes first and second ends 33, 35 that respectively provide the second hinge portion 32 and a sealing profile 34. In the example shown in FIG. 4, the sealing profile 34, which may be provided by a folded portion 46, is linear for engaging a flap 18 having a flat seal land or surface. In one example, the biasing member 36 is a torsion spring, as shown in FIG. 5. The torsion spring includes a coil 50 disposed over the pin 42 and located laterally within the gap (FIG. 3). The coil 50 includes first and second spring legs 52, 54 respectively engaging the seal holder 24 and the seal 26 to urge the seal 26 toward the flap 18.

In operation, a fluid F exits the nozzle 14 past the flaps 18. Another fluid is provided between the flap 18 and the structure 16 to provide a pressure P on the backside of the seal 26, which tends to rotate the seal 26 about the pin 42 toward the flap 18. This pressure P along with the force from the biasing member 36 maintains a seal between the seal 26 and the seal land 40. The hinged seal 26 can also more easily accommodate assembly tolerances by permitting the seal 26 to rotate about the pin 42 toward the seal holder 24. The disclosed configuration is able to accommodate larger deflections than rigid style seals.

Figure 6:
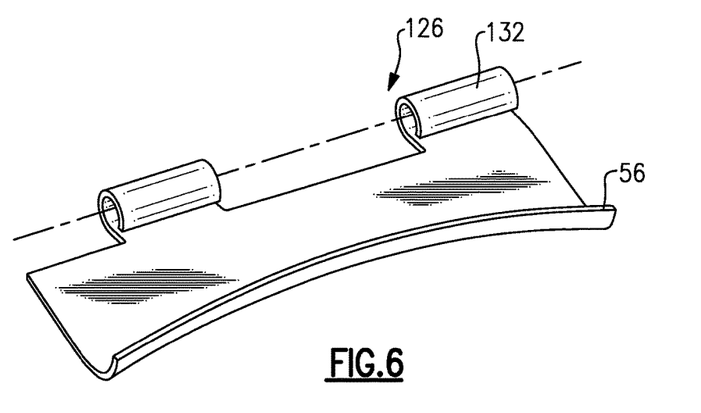
FIG. 6 is a perspective view of an example hinged seal.

Another example seal 126 is shown in FIG. 6. The seal 26 includes a second hinge portion 132 and a curved sealing profile 56, which is suitable for sealing against curved seal lands.

Figure 7:
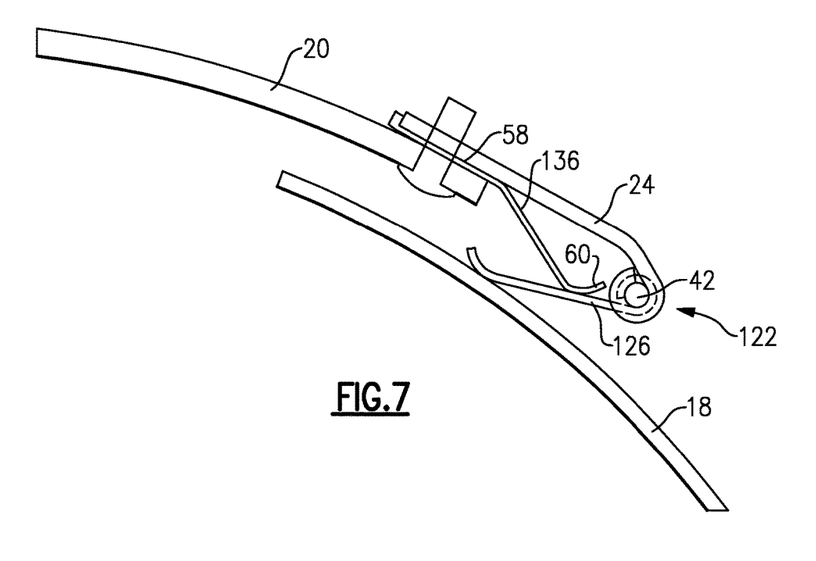
FIG. 7 is a cross-sectional view of another seal assembly.

Another seal assembly 122 is depicted in FIG. 7. The seal assembly 122 includes a seal 126 engaging the flap 18. This assembly utilizes an alternate biasing member. The biasing member 136 is a finger spring that includes a first end 58 supported between the hood 20 and the seal holder 24. A second end 60 extends from the first end 58 and engages the seal 126 to urge the seal 126 toward the flap 18.

Figure 8:
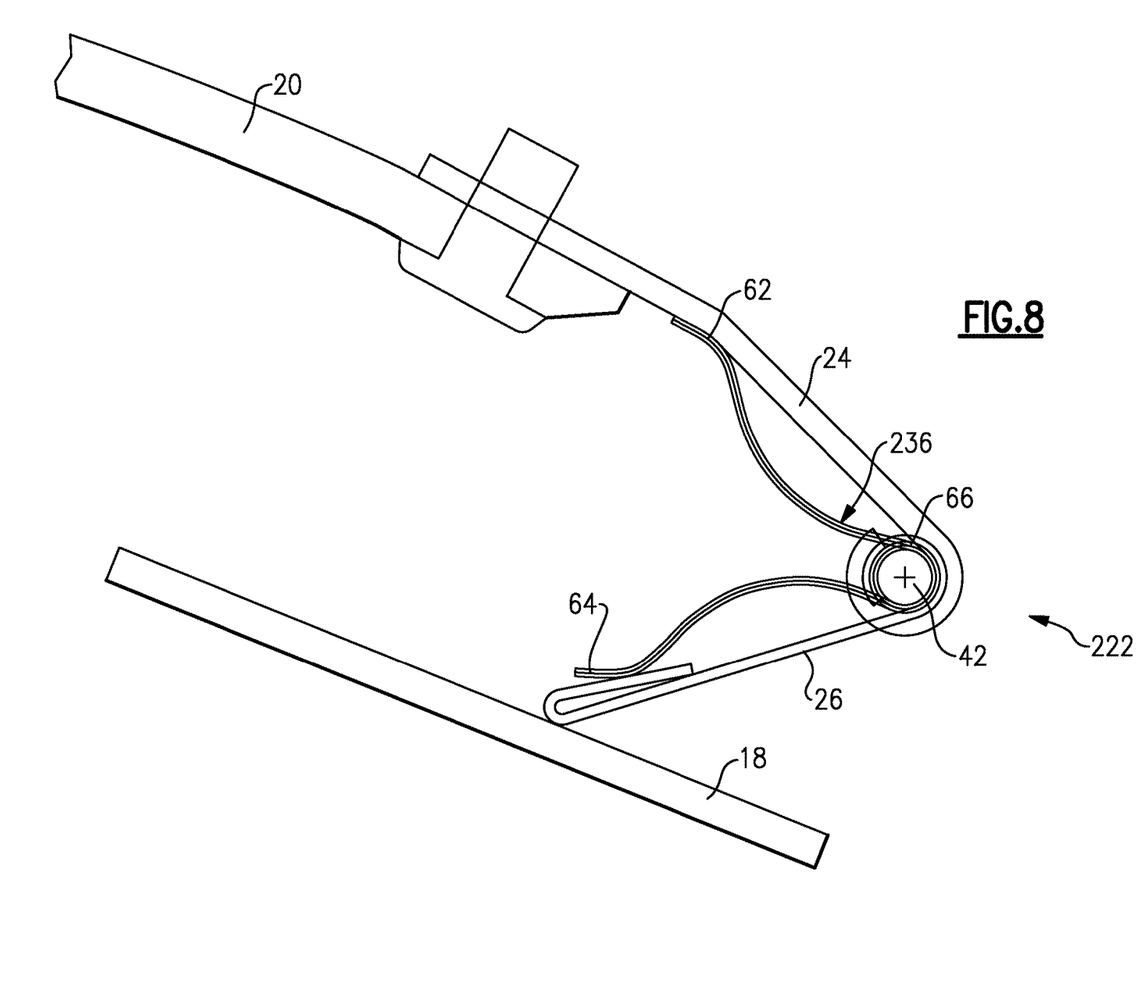
FIG. 8 is a cross-sectional view of yet another example seal assembly.
Figure 9:
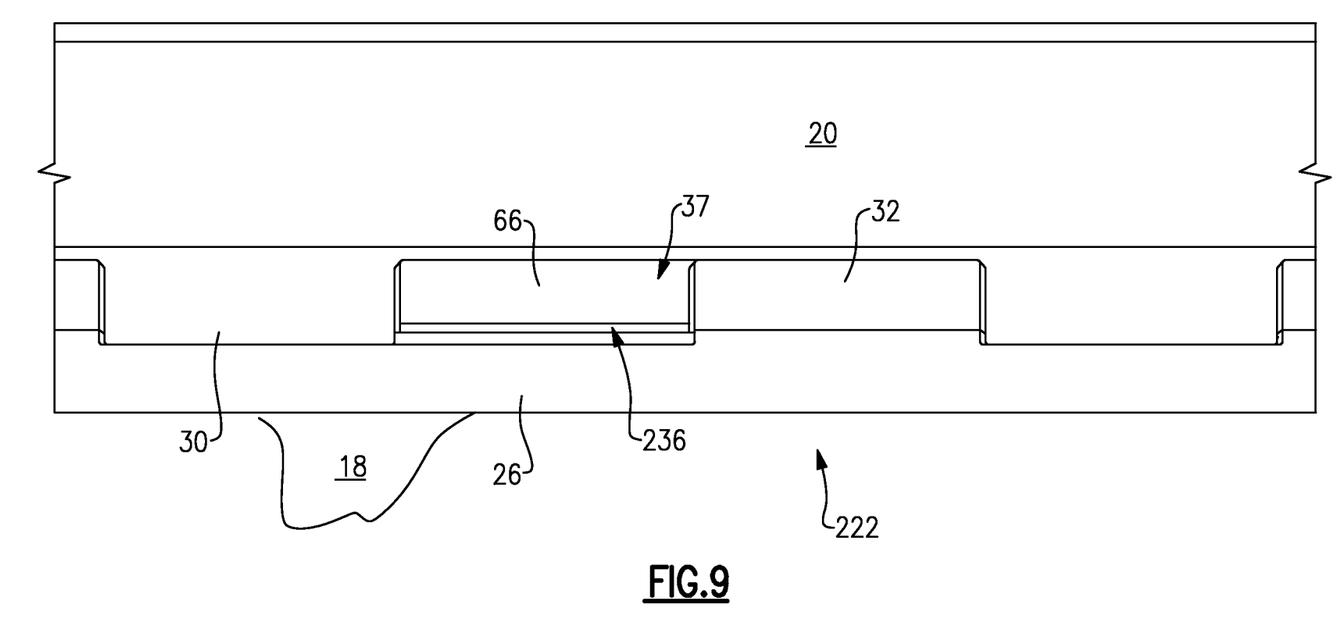
FIG. 9 is a rear view of the seal assembly illustrated in FIG. 8.

Another type of finger spring 236 is shown in FIGS. 8 and 9. The finger spring 236 includes first and second ends 62, 64 joined by an intermediate portion 66 that is supported by the pin 42. The intermediate portion 66 is arranged in the gap 37 and located laterally between the first and second hinge portions 30, 32. The first leg 62 engages the seal holder 24, and the second end 64 engages the seal 26.

Although an example embodiment has been disclosed, a worker of ordinary skill in this art would recognize that certain modifications would come within the scope of the claims. For that reason, the following claims should be studied to determine their true scope and content.

What is claimed is:

1. A method of sealing a cavity between a nozzle flap and a fixed structure, the method comprising the steps of:
providing a seal that extends between first and second ends, the first end provides a hinge portion, and the second end includes a laterally extending sealing profile;
supporting the hinged portion relative to a fixed structure along an axis to provide a V-shape with the seal and the fixed structure;
biasing the seal toward a seal land on a nozzle flap with a spring biasing member providing a spring biasing force and with pressurized fluid; and
rotating the seal about the axis and relative to the nozzle flap and the fixed structure to maintain sealing engagement between the sealing profile and the seal land in response to the spring biasing step and seal the cavity between the nozzle flap and the fixed structure.

2. The method according to claim 1, wherein the spring biasing step includes applying a fluid pressure to the seal.

3. The method according to claim 1, wherein the spring biasing step includes biasing the seal with a spring element.

4. A gas turbine engine nozzle comprising:
a static hood;
a seal holder extending from the static hood in a first axial direction to an end providing an pivotal axis, the seal holder secured to the static hood by fastening elements to provide a fixed structure;
a flap movable relative to the fixed structure;
a seal hinged about the pivotal axis and extending from the pivotal axis in a second axial direction opposite the first axial direction to a sealing profile engaging the flap, the seal and the seal holder configured in a V-shape, the seal rotatable about the pivotal axis and movable relative to the flap and the seal holder, the seal providing a pressurized backside facing the seal holder; and
a spring biasing member arranged at the pressurized backside of the seal and configured to continuously urge the seal toward and maintain engagement with a seal land on the flap.

5. The gas turbine engine nozzle according to claim 4, wherein the flap has first and second nozzle positions.

6. The gas turbine engine nozzle according to claim 4, wherein the fastening elements is at least one of a rivet and a bolt.

7. The gas turbine engine nozzle according to claim 4, wherein the seal profile is linear.

8. The gas turbine engine nozzle according to claim 4, wherein the seal is pivotally secured to the seal holder by a pin providing the pivotal axis, and the spring biasing member is supported by the pin and arranged laterally between the seal holder and the seal.

9. The gas turbine engine nozzle according to claim 8, wherein the spring biasing member is a torsion spring.

10. The gas turbine engine nozzle according to claim 8, wherein the spring biasing member is a finger spring.

11. The gas turbine engine nozzle according to claim 10, wherein the finger spring includes first and second ends, the finger spring first end supported by one of the static hood and the seal holder and the finger spring second end engages the seal and is movable relative to the finger spring first end.

12. The gas turbine engine nozzle according to claim 10, wherein the finger spring is generally V-shaped providing first and second legs joined by an intermediate portion, the intermediate portion supported by the pin, the first leg engaging one of the static hood and the seal holder, and the second leg engaging the seal.

* * * * *